United States Patent [19]
Brown, Jr.

[11] 3,877,721
[45] Apr. 15, 1975

[54] INFLATOR FOR OCCUPANT RESTRAINT CUSHION
[75] Inventor: Robert K. Brown, Jr., Sandusky, Ohio
[73] Assignee: General Motors Corporation, Detroit, Mich.
[22] Filed: June 25, 1973
[21] Appl. No.: 373,281

[52] U.S. Cl. ............................ 280/150 AB; 222/5
[51] Int. Cl. ......................................... B60r 21/08
[58] Field of Search ............ 280/150 AB; 222/3, 5; 73/420; 340/242; 200/83 N

[56] References Cited
UNITED STATES PATENTS

| 3,633,596 | 1/1972 | Gerber | 222/5 |
| 3,723,684 | 3/1973 | Greenwood | 280/150 AB |
| 3,735,376 | 5/1973 | Kermer et al. | 340/242 |
| 3,761,655 | 9/1973 | Whelan et al. | 280/150 AB |
| 3,773,353 | 11/1973 | Trowbridge et al. | 280/150 AB |
| 3,818,764 | 6/1974 | Wagner | 280/150 AB |

Primary Examiner—Kenneth H. Betts
Attorney, Agent, or Firm—Herbert Furman

[57] ABSTRACT

An inflator of the augmented type includes a pressure vessel and a combustion chamber containing a gas generating charge of propellant and opening to the pressure vessel. A low pressure sensor is rupturably secured to the combustion chamber around the opening. The sensor includes an inlet aperture in a wall thereof for admitting pressure fluid. A hollow impact member is mounted at one end to the sensor wall and opens to the inlet. A split sleeve mounts the other end of the impact member to a rupturable seal of the pressure vessel. The impact member conducts the pressure fluid to the inlet. The impact member impacts and ruptures the pressure vessel seal to communicate the pressure vessel with an occupant restraint cushion when the charge of propellant is initiated and the resultant high pressure gases blow the pressure sensor from the opening.

3 Claims, 2 Drawing Figures

PATENTED APR 15 1975

3,877,721

INFLATOR FOR OCCUPANT RESTRAINT CUSHION

This invention relates generally to inflators of the augmented type and more particularly to such inflators having a combustion chamber outlet sealed by a pressure sensor for the pressure vessel.

It is known to seal the combustion chamber with a rupturable diaphragm formed integrally with the combustion chamber or formed separately and secured to the chamber. It is also known to mount an impact member to the rupturable seal of the combustion chamber for impacting and removing a severable outlet plug of the pressure vessel to communicate the vessel with an occupant restraint cushion. It is also known to provide the pressure vessel with a low pressure sensor to give a signal when the pressure of the gas within the pressure vessel has dropped below a set level.

Copending application Ser. No. 373,388, Richard L. Merrell, filed June 25, 1973, and assigned to the assignee of this invention, discloses an augmented type inflator having the low pressure sensor for the pressure vessel providing the rupturable seal for the combustion chamber outlet.

In Merrell, the low pressure sensor is mounted to the combustion chamber around the outlet thereof and is connected through the combustion chamber with an external indicator circuit. The pressure sensor includes an inlet aperture to a pressure responsive diaphragm thereof. A hollow impact member is welded to the pressure sensor and mounted to a rupturable seal of the pressure vessel to impact and remove the seal when the pressure sensor is blown from the combustion chamber outlet upon initiation of the charge of propellant in the combustion chamber.

This invention uses the impact member as the conduit of pressure fluid to the inlet aperture. While Merrell discloses the admittance of pressure fluid to the inlet aperture both by an opening through the weld of the impact member to the pressure sensor and through the hollow impact member, the latter forms no part of that invention.

In the preferred embodiment of this invention, the hollow impact member has one end thereof secured within a hollow boss of the pressure sensor surrounding the inlet aperture. The other end of the impact member mounts a split sleeve received in a boss of an integral severable seal in the outlet wall of the pressure vessel. The pressure fluid enters the impact member through the split sleeve and then passes to the inlet aperture.

The primary feature of this invention is that it provides an improved augmented type inflator having the combustion chamber thereof sealed by a pressure sensor and mounting a hollow tubular member which provides a conduit for transmitting pressure fluid to the sensor inlet and also funtions as an impact member to open the pressure vessel when the charge of propellant within the combustion chamber is initiated and the resultant generated gases blow the sensor from the combustion chamber.

This and other features of the invention will be readily apparent from the following specification and drawings wherein.

Figure 1:
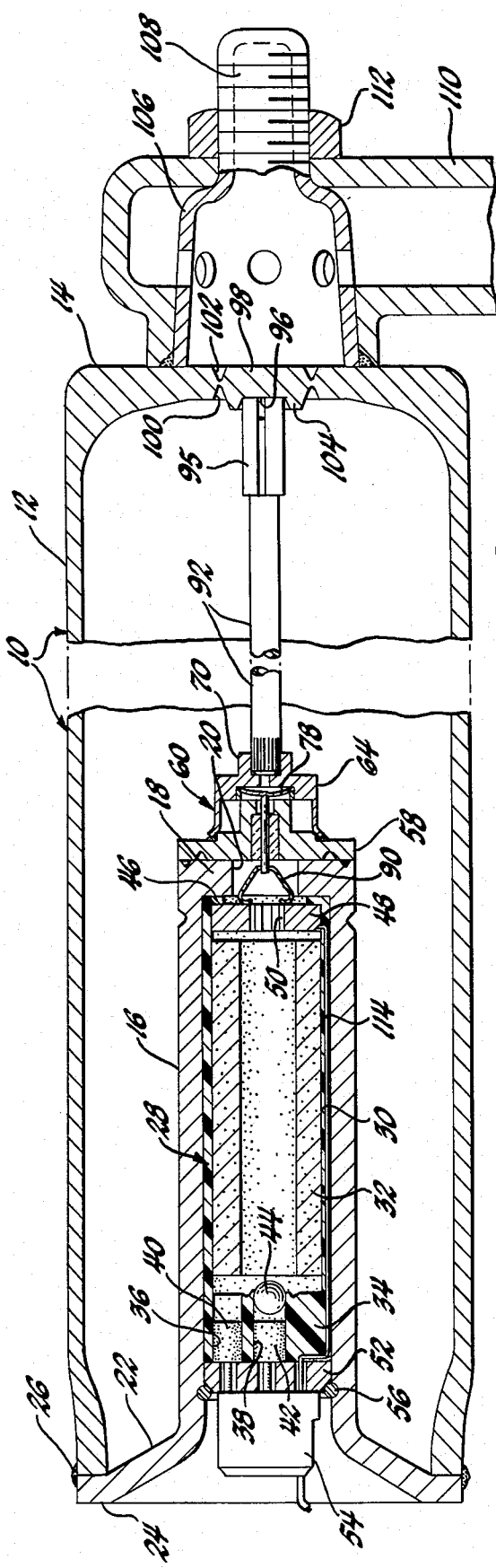
FIG. 1 is a sectional view of an inflator according to this invention.

Referring now particularly to FIG. 1 of the drawings, an inflator 10 according to this invention includes a cylindrical pressure vessel 12 which includes an integral wall 14 closing one end thereof. A cylindrical combustion chamber 16 fits within the pressure vessel and includes an inner wall 18 provided with a cylindrical outlet 20 coaxial with the combustion chamber. The other end of the combustion chamber includes an outwardly flaring or conical wall 22 which terminates in a radial flange 24. Flange 24 seats against the open end of the pressure vessel and is welded thereto at 26 in a conventional manner in order to close the pressure vessel. The pressure vessel is filled with any suitable gas under pressure, such as argon at 2400 psi.

The combustion chamber 16 includes a cartridge assembly 28 which is disclosed in detail and claimed in copending applications Ser. No. 331,663, Charles N. Hay, filed Feb. 12, 1973, and Ser. No. 373,282, Philip B. Zeigler, filed June 25, 1973, both assigned to the assignee of this invention. Generally, the cartridge assembly 28 includes a cylindrical plastic housing 30 which fits within the combustion chamber and contains a cylindrical charge 32 of propellant for generating high pressure, high temperature gases when the charge is initiated. Propellants such as this are known in the art and therefore no further description is necessary. The outer end wall 34 of the housing 30 is substantially thick and is provided with a pair of bores 36 and 38. Bore 36 contains an igniter or initiating element 40 and bore 38 likewise contains a squib 42. Retained within the bore 38 to the right of squib 42 is a conventional ball 44.

The inner end of the housing 30 includes a partial radial flange 46 which seats and retains a metal closure plate 48 having a central fluted orifice 50. The outlet 20, the orifice 50 and the ball 44 are coaxial. A seal plate 52 is secured to the wall 34 and mounts an electrical plug 54. The plug 54 is connected to the igniter 40 and squib 42 by electrical wires extending through the seal plate. The cartridge assembly is retained within the combustion chamber by a circular split ring 56 engaged in a semicircular groove in the combustion chamber wall and also engaged by the chamfered outer edge of the seal plate.

The plug 54 connects the igniter and squib with a known multi-level actuation system for a vehicle occupant restraint system. Such actuation systems can include a velocity responsive sensor and an inertia responsive sensor. Should the velocity responsive sensor or the inertia sensor sense low level impact conditions, the igniter 40 will be connected with the vehicle battery or other source of power to thereby initiate the charge 32 of propellant to generate high temperature, high pressure gases. Should the impact conditions sensed by of a higher level, then the squib 42 is connected to the same source of power to fire the ball 44 into the orifice 50. This restricts the orifice area and increases the pressure within the combustion chamber to increase the burn rate. The foregoing description is brief but reference may be had to the aforenoted copending applications for further details.

Figure 2:
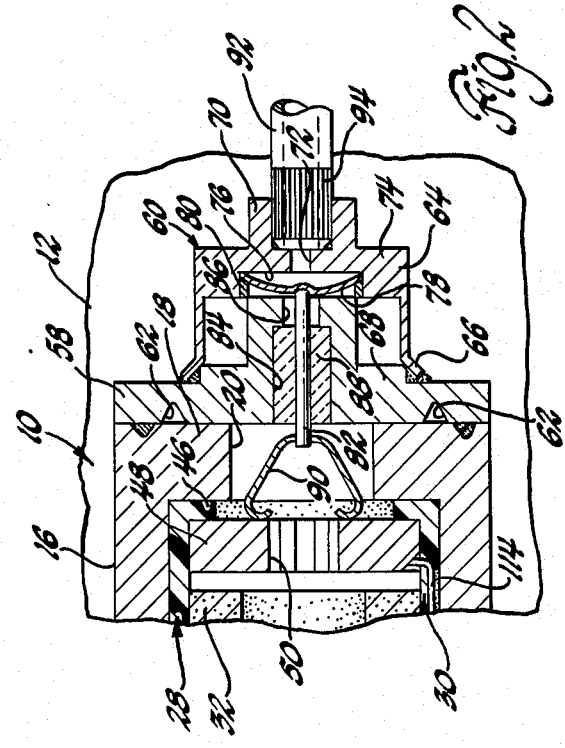
FIG. 2 is an enlarged view of a portion of FIG. 1.

As shown in FIGS. 1 and 2, a seal plate 58 of a pressure sensor 60 fits against the wall 18 of the combustion chamber and is welded thereto adjacent the outer periphery thereof and radially outwardly of a continuous V cross section groove 62 thereof. A cup-shaped housing 64 has a flared flange 66 thereof welded to a boss 68 of the plate 58. A circular boss 70 of housing 64 opens to an inlet aperture 72 in the base wall 74 of housing 64. The aperture 72 opens to a bore 76 in the wall 74.

A dish-shaped pressure-responsive diaphragm 78 fits within the bore 76 and is retained therein by a press fitted ring 80.

A switch contact 82 is received within bores 84 and 86 of the plate 58 and is glass welded at 88 to the bore 84. The outer end of the switch contact engages and seats against the diaphragm 78. A U-shaped spring finger contact 90 is secured to the inner end of the switch contact 82 and slidably bears on the plate 48.

A hollow tubular impact member 92 has one roughened or lightly splined end 94 thereof force fitted within the boss 70 in order to fixedly secure the impact member to the pressure sensor 60. As shown in FIG. 1, the other end of the member 92 is frictionally fitted with a split sleeve 95 which seats within a counterbore 96 of a severable or rupturable seal 98 formed integrally with wall 14 of the pressure vessel. The seal 98 is defined by opposing V-shaped circular grooves 100 and 102 formed in the wall 14, with the material from the groove 100 providing the rib 104 which defines the counterbore 96.

A hollow tapered outlet member 106 is welded or otherwise secured to the wall 14 around the seal 98 and includes an integral threaded extension 108. A manifold 110 is received over the outlet member 106 and secured to extension 108 by a nut 112. Although not shown herein, the manifold 110 communicates with a conventional diffuser of an occupant restraint system and the diffuser in turn communicates with a conventional inflatable occupant restraint cushion.

With reference to FIG. 2, after the plate 58 has been assembled to the housing 64, the space therebetween to the left of the diaphragm 78 is filled with a suitable gas at a predetermined reference pressure, such as 1800 psi. The pressure sensor can then be assembled to the combustion chamber by welding the plate 58 to the wall 18 to close the outlet 20 of the combustion chamber.

A wire 114 extends from the plate 48 through a groove in the housing 30 and through wall 34 and plate 52 to the plug 54. From the plug 54, the wire is connected into an external indicator circuit which gives a signal when the pressure of the fluid within the pressure vessel 12 drops below the reference pressure, such as 1,800 psi, within the pressure sensor, and the diaphragm 78 moves out of contact with the switch contact 82.

With reference to FIG. 1, the fluid within the pressure vessel 12 is admitted to the bore 76 to the right of the diaphragm 78 by passing through the slot of sleeve 95, through the bore of the tubular member 92, and then through the inlet aperture 72.

When the high pressure gases generated by initiation of the charge 32 of propellant reach a predetermined level, the plate 58 will rupture at the groove 62 and the gases will the blow or move the pressure sensor 60 to the right to open the outlet 20 and permit these gases to flow into the pressure vessel. Simultaneously, the sensor 60 will shift the rod 92 to the right and the right end of the rod will move within the split sleeve 95 and impact seal 98 to remove the seal and permit the combined generated gases and pressure vessel gas to flow to the occupant restraint cushion and thereby inflate the cushion.

It will be noted from the foregoing description that both the pressure sensor and the switch contact 90 are easily and effectively removed to open the outlet 20 when the generated gases within the combustion chamber reach a predetermined level.

If at any time the pressure within the pressure vessel 12 drops below the reference pressure level, 1,800 psi, the diaphragm 78 will move to the right to actuate the indicator circuit and indicate to the vehicle operator that the pressure within the pressure vessel has dropped below such minimum.

Thus, this invention provides an improved inflator.

I claim:

1. An inflator comprising, in combination, a pressure vessel containing pressure fluid and provided with a normally closed rupturable outlet controlling flow of the pressure fluid to an occupant restraint cushion, a combustion chamber within the pressure vessel and including an outlet open to the pressure vessel, a gas generating charge of propellant within the combustion chamber, pressure sensor means for sensing the pressure level in the pressure vessel and including a substantially closed chamber having an inlet wall provided with an aperture therein, pressure responsive means within the chamber and being subjected to the pressure of the pressure fluid through the inlet wall aperture, means mounting the pressure sensor means to the combustion chamber over the outlet thereof to normally close the outlet from the combustion chamber to the pressure vessel, a hollow annular impact member for impacting and rupturing the pressure vessel outlet, means mounting the impact member to the pressure sensor means and to the rupturable outlet with the member opening to the aperture of the inlet wall and to the pressure fluid for conducting pressure fluid to the aperture, and means for initiating the charge of propellant to generate high pressure gas and move the pressure sensor means from the outlet, the impact member impacting and rupturing the rupturable outlet upon movement of the pressure sensor means to open the pressure vessel outlet to the cushion.

2. An inflator comprising, in combination, a pressure vessel containing pressure fluid and provided with a normally closed rupturable outlet controlling flow of the pressure fluid to an occupant restraint cushion, a combustion chamber within the pressure vessel and including an outlet open to the pressure vessel, a gas generating charge of propellant within the combustion chamber, pressure sensor means for sensing the pressure level in the pressure vessel and including a substantially closed chamber having an inlet wall provided with an aperture therein, pressure responsive means within the chamber and being subjected to the pressure of the pressure fluid through the inlet wall aperture, means mounting the pressure sensor means to the combustion chamber over the outlet thereof to normally close the outlet from the combustion chamber to the pressure vessel, a hollow annular impact member for impacting and rupturing the pressure vessel outlet, means sealing one end of the impact member to the pressure sensor means and to the rupturable outlet with the interior of the member opening to the aperture of the inlet wall, means opening the interior of the impact member adjacent the other end thereof to the pressure fluid for conducting pressure fluid to the aperture, and means for initiating the charge of propellant to generate high pressure gas and move the pressure sensor means from the outlet, the impact member impacting and rupturing the rupturable outlet upon movement of the pressure sensor means to open the pressure vessel outlet to the cushion.

3. An inflator comprising, in combination, a pressure vessel containing pressure fluid and provided with a normally closed rupturable outlet controlling flow of the pressure fluid to an occupant restraint cushion, a combustion chamber within the pressure vessel and including an outlet open to the pressure vessel, a gas generating charge of propellant within the combustion chamber, pressure sensor means for sensing the pressure level in the pressure vessel and including a substantially closed chamber having an inlet wall provided with an aperture therein, pressure responsive means within the chamber and being subjected to the pressure of the pressure fluid through the inlet wall aperture, means mounting the pressure sensor means to the combustion chamber over the outlet thereof to normally close the outlet from the combustion chamber to the pressure vessel, a tubular impact member for impacting and rupturing the pressure vessel outlet, means sealing one end of the tubular member to the pressure sensor means and to the rupturable outlet with the interior of the tubular member opening to the aperture of the inlet wall, means adjustably securing the other end of the impact member to the rupturable outlet and including an opening therethrough to the interior of the impact member for conducting pressure fluid to the aperture, and means for initiating the charge of propellant to generate high pressure gas and move the pressure sensor means from the outlet, the other end of the impact member inpacting and rupturing the rupturable outlet upon movement of the pressure sensor means to open the pressure vessel outlet to the cushion.

* * * * *